US008927466B2

(12) United States Patent
Prebensen et al.

(10) Patent No.: US 8,927,466 B2
(45) Date of Patent: Jan. 6, 2015

(54) FLUID PRESSURE TRANSMISSION PILL

(75) Inventors: Ole Iacob Prebensen, Sogne (NO);
Monica Norman, Stavanger (NO);
Anne-Marie Friestad, Sandnes (NO);
Egil Ronaes, Hundvag (NO)

(73) Assignee: M-I LLC, Houston, TX (US)

( * ) Notice: Subject to any disclaimer, the term of this patent is extended or adjusted under 35 U.S.C. 154(b) by 1275 days.

(21) Appl. No.: 12/594,554

(22) PCT Filed: Apr. 3, 2008

(86) PCT No.: PCT/US2008/059283
§ 371 (c)(1),
(2), (4) Date: Apr. 14, 2010

(87) PCT Pub. No.: WO2008/124516
PCT Pub. Date: Oct. 16, 2008

(65) Prior Publication Data
US 2010/0186957 A1    Jul. 29, 2010

Related U.S. Application Data

(60) Provisional application No. 60/909,895, filed on Apr. 3, 2007.

(51) Int. Cl.
| C09K 8/40 | (2006.01) |
| E21B 43/00 | (2006.01) |
| C09K 8/42 | (2006.01) |
| C09K 8/502 | (2006.01) |
| C09K 8/508 | (2006.01) |
| E21B 21/08 | (2006.01) |
| E21B 33/16 | (2006.01) |

(52) U.S. Cl.
CPC ............... *C09K 8/426* (2013.01); *C09K 8/502* (2013.01); *C09K 8/508* (2013.01); *E21B 21/08* (2013.01); *E21B 33/16* (2013.01)

USPC .......... 507/211; 507/212; 507/213; 507/214; 507/219; 507/263; 507/265; 507/267; 507/268; 166/300

(58) Field of Classification Search
None
See application file for complete search history.

(56) References Cited

U.S. PATENT DOCUMENTS

| 6,767,868 | B2 |   | 7/2004  | Dawson et al. |         |
|-----------|----|---|---------|---------------|---------|
| 7,727,938 | B2 | * | 6/2010  | Ballard       | 507/218 |
| 8,076,270 | B2 | * | 12/2011 | Smith et al.  | 507/203 |
| 8,207,097 | B2 | * | 6/2012  | Sanders et al.| 507/277 |
| 2003/0148892 | A1 | * | 8/2003 | Klein et al.  | 507/100 |
| 2004/0069537 | A1 |   | 4/2004 | Raddy et al.  |         |

(Continued)

FOREIGN PATENT DOCUMENTS

WO    0047691 A1    8/2000

OTHER PUBLICATIONS

Office Action issued in corresponding Eurasian Application No. 200970917 dated Aug. 1, 2011 (2 pages).

(Continued)

*Primary Examiner* — John J Figueroa
(74) *Attorney, Agent, or Firm* — Osha Liang LLP

(57) ABSTRACT

A pill for wellbore operations, that includes a base fluid; and at least two polymers that interact to form a gelatinous structure characterized as isolating and controllably transmitting hydrostatic pressure between a first wellbore fluid above the pill in a wellbore and a second wellbore fluid below the pill in the wellbore is disclosed.

21 Claims, 1 Drawing Sheet

(56) References Cited

U.S. PATENT DOCUMENTS

| | | |
|---|---|---|
| 2006/0025312 A1 | 2/2006 | Santra et al. |
| 2006/0266522 A1* | 11/2006 | Eoff et al. ............ 166/278 |
| 2007/0062703 A1 | 3/2007 | Walters et al. |
| 2007/0249504 A1* | 10/2007 | Ballard ............ 507/207 |
| 2007/0287767 A1* | 12/2007 | Ballard ............ 523/130 |

OTHER PUBLICATIONS

Office Action issued in corresponding Canadian Application No. 2,682,949 dated May 30, 2011 (2 pages).

Examination Report issued in Australian Application No. 2008237340 dated Jun. 21, 2010 (2 pages).

International Search Report for PCT/US2008/059283 mailed Aug. 28, 2008 (3 pages).

Office Action issued in corresponding Eurasian Application No. 200970917 dated Mar. 25, 2011 (3 pages).

Office Action issued in corresponding Eurasian Applicaton No. 200970917 dated Apr. 4, 2012 (2 pages).

European Search Report issued in European Application No. 08745025.0 dated Mar. 22, 2011 (8 pages).

Official Action issued in corresponding Eurasian Applicaton No. 200970917 dated Dec. 12, 2012 (2 pages).

Official Action issued in corresponding European Applicaton No. 08 745 025.0-1355 dated Aug. 30, 2013 (5 pages).

* cited by examiner

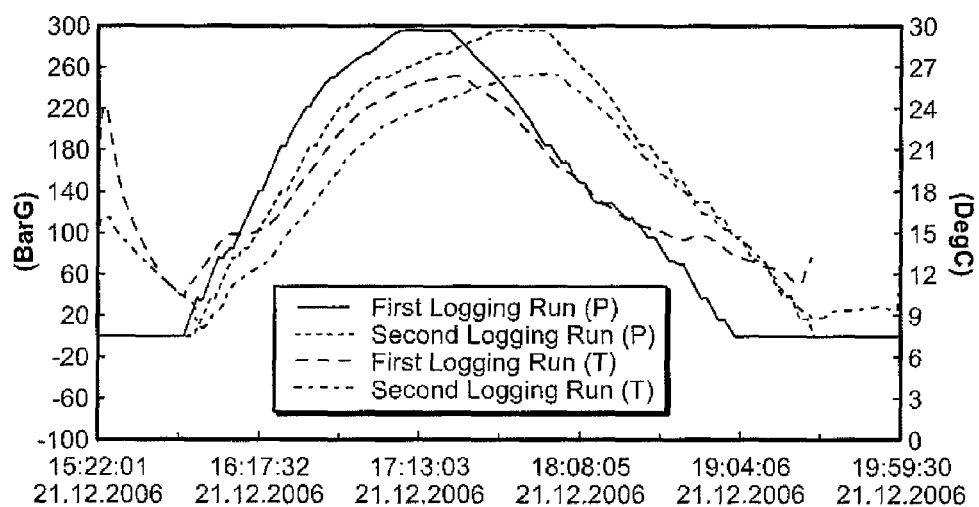

FLUID PRESSURE TRANSMISSION PILL

CROSS-REFERENCE TO RELATED APPLICATIONS

This application claims priority to U.S. Patent Application No. 60/909,895, filed on Apr. 3, 2007, which is herein incorporated by reference in its entirety.

BACKGROUND OF INVENTION

1. Field of the Invention

Embodiments disclosed herein relate generally to pills for wellbore operations. In particular, embodiments disclosed herein related to pills having a gelatinous structure.

2. Background Art

When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, maintaining well stability, suspending solids in the well, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation. Further, fluid in the annulus provides a static head which assists in maintaining the hydrostatic equilibrium in the wellbore, thereby controlling formation fluid pressure to prevent blowouts and minimizing fluid loss into and stabilizing the formation through which the well is being drilled Many difficulties in drilling are due to the wellbore pressure deviating outside of the pressure gradient window during a particular drilling operation. As a result, the use managed pressure drilling (MPD) techniques has increased as a way to reduce or prevent rig down time. In MPD, the annular pressures in drilling and completing a well are accurately controlled. As a well is drilled, the circulation of the wellbore fluid may be used to achieve the desired bottom hole pressure. However, in a static well, the pressure is solely determined by the hydrostatic pressure of the wellbore fluid.

Further, in MPD, a closed loop circulation system is generally used, combing hydrostatic pressure control with frictional pressure control. A lower mud weight is typically used, and a secondary choke is applied to create a combined annular pressure profile within the well.

Accordingly, there exists a continuing need to developments in accurate control of pressures in a wellbore.

SUMMARY OF INVENTION

In one aspect, embodiments disclosed herein relate to a pill for wellbore operations, that includes a base fluid; and at least two polymers that interact to form a gelatinous structure characterized as isolating and controllably transmitting hydrostatic pressure between a first wellbore fluid above the pill in a wellbore and a second wellbore fluid below the pill in the wellbore.

In another aspect, embodiments disclosed herein relate to method of a wellbore operation that includes emplacing a first wellbore fluid in a wellbore; spotting a pill to a region within the emplaced first wellbore fluid; and allowing the spotted pill to viscosify and separate the first wellbore fluid into an upper section and a lower section, wherein the viscosified pill is a gelatinous structure characterized as isolating and controllably transmitting hydrostatic pressure between the two fluid sections.

In yet another aspect, embodiments disclosed herein relate to a process for completing a well that includes emplacing a first wellbore fluid having a first density in a wellbore; spotting a pill to a region within the emplaced first wellbore fluid; allowing the spotted pill to viscosify and separate the first wellbore fluid into an upper section and a lower section, wherein the viscosified pill is a gelatinous structure characterized as isolating and controllably transmitting hydrostatic pressure between two fluid sections; and emplacing a second wellbore fluid having a second density greater than the first density in the wellbore, wherein the emplacement of the second wellbore fluid displaces at least a portion of the upper section of first wellbore fluid.

Other aspects and advantages of the invention will be apparent from the following description and the appended claims.

BRIEF DESCRIPTION OF DRAWINGS

FIG. 1 is graph of the wire line logs of an exemplary well in accordance with an embodiment of the present disclosure.

DETAILED DESCRIPTION

In one aspect, embodiments disclosed herein relate to a pill for wellbore operations. In particular, embodiments disclosed herein related to a pill having a gelatinous structure, whereby the pill may isolate and controllably transmit hydrostatic pressure between two fluids on either side of the pill.

In one embodiment, a pill of the present disclosure may be formed from a base fluid and at least two polymers that interact to form a gelatinous structure that may isolate and controllably transmit hydrostatic pressure between two fluids on either side of the pill. As used herein, isolation of two fluids refers to the avoidance of channeling between the two fluids separated by the pill, for example, channeling of a lighter fluid into a denser fluid. Further, as also used herein, the term controllably implies that the pill allows for a user to assist in pressure management of a well, not that absolute control is necessarily present.

In a particular embodiment, a pill of the present disclosure has elastomeric properties. In another embodiment, the pill of the present disclosure is substantially solids-free.

Base Fluid

In various embodiments of the present disclosure, the pill may be a water-based fluid, an invert emulsion, or an oil-based pill.

Water-based pills may have an aqueous fluid as the base fluid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oil-based/invert emulsion pills may include an oleaginous continuous phase and a non-oleaginous discontinuous phase for the base fluid. The oleaginous fluid may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. The concentration of the oleaginous fluid should be sufficient so that an invert emulsion forms and may be less than about 99% by volume of the invert emulsion. In one embodiment, the amount of oleaginous fluid is from about 30% to about 95% by volume and more preferably about 40% to about 90% by volume of the invert emulsion fluid. The oleaginous fluid, in one embodiment, may include at least 5% by volume of a material selected from the group including esters, ethers, acetals, dialkylcarbonates, hydrocarbons, and combinations thereof.

The non-oleaginous fluid used in the formulation of the invert emulsion base fluid disclosed herein is a liquid and may be an aqueous liquid. In one embodiment, the non-oleaginous liquid may be selected from the group including sea water, a brine containing organic and/or inorganic dissolved salts, liquids containing water-miscible organic compounds, and combinations thereof. The amount of the non-oleaginous fluid is typically less than the theoretical limit needed for forming an invert emulsion. Thus, in one embodiment, the amount of non-oleaginous fluid is less that about 70% by volume, and preferably from about 1% to about 70% by volume. In another embodiment, the non-oleaginous fluid is preferably from about 5% to about 60% by volume of the invert emulsion fluid. Thus, in various embodiments, the base fluid phase may include either an aqueous fluid or an oleaginous fluid, or mixtures thereof.

Gelatinous Structure

The gelatinous structure of the pill of the present disclosure may be formed as a result of polymer interactions, such as ionic interactions and/or crosslinking, between two polymers. The resulting gelatinous structure may be characterized as having the ability to isolate and controllably transmit hydrostatic pressure between two fluids. In various embodiments, the two polymers used to form the gelatinous structure may be identical or similar in structure or may have distinct chemical structures.

Various types of polymers that may be used to form the gelatinous structure of the present disclosure include various natural or synthetic polymers. Examples of polymers that may be used in the pill of the present disclosure include typical natural polymers and derivatives such as xantham gum, diutan, hydroxyethyl cellulose (HEC), or other polysaccharide or polysaccharide derivatives or synthetic polymers and oligomers such as poly(ethylene glycol) [PEG], poly(diallyl amine), poly(acrylamide), poly(aminomethylpropyl sulfonate) [AMPS polymer], poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam) and co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, vinyl lactam, and aliphatic amine polymers including polyetheramines and polyethylenimines.

In another embodiment, at least one of the polymers may be an aliphatic amine such as polyetheramine. Example of polyetheramine include those commercially available under the trade name Jeffamine® Huntsman Performance Products (Woodlands, Tex.). For example, useful Jeffamine® products may include triamines Jeffamine® T-5000 and Jeffamine® T-3000 or diamines such as as Jeffamine® D-400 and Jeffamine® D-2000. Useful polyetheramines may possess a repeating polyether backbone and may vary in molecular weight from about 200 to about 5000 g/mol. In various embodiments, a polyetheramine may be used as a crosslinking agent to crosslink a natural or synthetic polymer. While reference to only polyetheramine as a crosslinking agent is made, one of ordinary skill in the art would appreciate that various other crosslinking agents may also be used to crosslink a variety of natural or synthetic polymers to form a pill of the present disclosure.

In a particular embodiment, a natural polymer such as a xanthan gum derivative may be used in combination with a polyetheramine to form the gelatinous structure of the present disclosure. In such an embodiment, the natural polymer may be used in an amount ranging from 2 to 7 llb/bbl while the polyetheramine is used in amount ranging from about 2 to 15 percent by volume.

Wellbore Operations

The pill of the present disclosure may be used in various types of wellbore operations to isolate two wellbore fluids (or two sections of a wellbore fluid) in a wellbore from each other, while simultaneously controllably transmitting hydrostatic pressure therebetween.

In a wellbore having a first wellbore fluid emplaced therein, a pill treatment comprising a base fluid and polymers may be spotted a particular region of the wellbore where the gelatinous pill is desired. In a particular embodiment, the base fluid may have a density substantially identical to that of the first wellbore fluid. Upon viscosification of the pill components, the gelatinous structure will isolate an upper region or section of the first fluid from a lower region or section of the first wellbore. If desired, a second wellbore fluid may be emplaced in the wellbore, and displace the upper section of first wellbore fluid.

In a particular embodiment, the second wellbore fluid may have a greater density than the first wellbore fluid, thereby allowing displacement of the upper section of the first wellbore fluid. By allowing for the controllable transmission of hydrostatic pressure across the pill, the bottom hole pressure of the wellbore may be controlled.

The pill of the present disclosure may, for example, be spotted in a wellbore during completion operations. Thus, in one embodiment, the wellbore fluid present in the wellbore may be a brine, a potassium/cesium brine in a particular embodiment, having a first given specific gravity. A pill comprised of a brine base fluid may be spotted within the wellbore, dividing the wellbore into an upper and lower section. Once the pill is allowed to viscosify or set, the upper section of the wellbore fluid may be displaced by a second fluid having a specific gravity greater than the first fluid. Subsequent completion operations, including the positioning, repositioning, or removal of liner(s), logging operations and placement of wireline, and screen placement may be performed, each involving mechanical interruption of the pill, and the spotted pill may remain substantially intact, i.e., maintain its integrity.

Further, while the above refers to a completion operation, one of ordinary skill in the art would appreciate that the pill of the present disclosure may be appropriate in other wellbore operations where a pill that can isolation and transmit hydrostatic pressure between two fluid sections may be desired. For example, it may be desirable to use a pill of the present disclosure as a lost circulation pill, as a cement plug whereby the pill may serve as a base on top of which cement may be placed, or as a kick-off plug for sidetracking.

One of ordinary skill in the art would appreciate that the first and second wellbore fluids may be any type of fluid, and that the particular type may depend on the particular wellbore operation being performed. Thus, in various embodiments, the first and second wellbore fluids may include either an aqueous fluid or an oleaginous fluid, or mixtures thereof, such as those described above.

Additionally, also depending on the particular wellbore operations, additives that may be included in the wellbore fluids disclosed herein include, for example, wetting agents, organophilic clays, viscosifiers, fluid loss control agents, surfactants, dispersants, interfacial tension reducers, pH buffers, mutual solvents, thinners, thinning agents, and cleaning agents. The addition of such agents should be well known to one of ordinary skill in the art of formulating drilling fluids and muds.

EXAMPLES

The following examples are used to test the effectiveness of the pill disclosed herein Example 1

Setting Times

A cesium/potassium formate field mud sample having a mud weight of 2.04 sg was used to form various exemplary pills separating a 1.87 sg fluid from a 2.08 sg fluid from each other. A saturated potassium formate fluid (1.57 sg) was used to reduce mud weight, and a 2.19 sg cesium formate fluid was used to increase mud weight. Additionally, a cesium formate brine was also tested as a base fluid.

Several 1.87 sg pills were tested with various concentrations of DUO-TEC™ NS, a xanthan gum polymer, and EMI-771, a polyetheramine, both available from M-I LLC (Houston, Tex.), and with various setting times. The base fluid and xanthan polymer were mixed for 5 minutes using a Silverson or Hamilton Beach mixer. The polyetheramine was added and the mixture mixed for an addition 2 minutes. To avoid early setting of the pill, the mixture was mixed using a paddle mixer until the pill was ready to be pumped. A small pipe of steel was used to simulate a liner. The results are shown below in Table 1.

TABLE 1

| 1.87 sg Cs/K mud pill - Setting time at 40° C. | | | | | |
|---|---|---|---|---|---|
| 10 kg/m³ DUO-TEC ™ NS | | | | | |
| EMI-771 | 3% | 5% | 7% | 9% | 11% |
| 2 hours | No plug. Test stopped | No plug. Test stopped | Start plugging | Soft plug. Test stopped | Soft plug. Test stopped |
| 5 hours | — | — | Soft plug. Test stopped | — | — |
| 15 kg/m³ DUO-TEC ™ NS | | | | | |
| EMI-771 | 7% | 9% | 11% | 15% | 20% |
| 2 hours | Medium plug | Medium plug | Medium plug | Hard plug | Hard plug |
| 5 days | — | Medium plug | Medium plug | Hard plug | Hard plug |
| 17 kg/m³ DUO-TEC ™ NS | | | | | |
| EMI-771 | | 15% | | 20% | |
| 5 days | | Very hard plug | | Very hard plug | |
| 1.87 CsF brine pill 0 Setting time at 40° C. | | | | | |
| | 10 kg/m³ DUO-TEC ™ NS | | 8 kg/m³ DUO-TEC ™ NS | | |
| EMI-771 | 10% | 8% | 10% | 8% | |
| 1 hour | Soft gel | Very soft gel | Very soft gel | Very soft gel | |
| 2 hours | Medium gel | Medium gel | Medium gel | Medium gel | |
| 3 hours | Hard gel | Hard gel | Hard gel | Hard gel | |

When the steel pipe was used to simulate positioning of a liner through the pill, a pill comprising 15 kg/m³ DUO-TEC™ NS and 15% EMI-771, which may be abbreviated as "the 15/15 concentration," set up too fast, and there were difficulties in getting the pipe through the pill. The 12/12 concentrations also set too quickly and maintained a semihard plug. Thus, it was decided to continue testing with the 10/10 concentration.

Example 2a

Separation Ability at 40° C. and at 30 Degrees Inclination

The ability to isolate two fluid sections was investigated by testing the pill in measuring cylinders. DUOVIS™ Plus NS, a xanthan gum available from M-I LLC (Houston, Tex.) was added to the fluids to given a rheology profile closer to the field samples. The specifics of each test and results are shown below in Table 2.

the pill was still intact, and there was no channeling of the two fluids.

Example 3

Ability to Transmit Hydrostatic Pressure

A manometer was placed on the bottom of the pipe described in Example 2b to check if the pill would transmit hydrostatic pressure when displacing from 1.87 sg CsF to 2.08 sg CsF. As shown below in Table 3, the pill transmitted the hydrostatic pressure from the upper, more dense fluid to the bottom of the pipe.

TABLE 2

| Test | Measuring Cylinder | Procedure | Comments |
|---|---|---|---|
| 1.87 sg Cs/K mud pill - Measuring Cylinder - Vertical | | | |
| Test 1 | Top: 1.87 sg mud<br>Mud Pill - 15/15<br>Bottom: 1.87 sg mud | Placed 1.87 sg mud in measuring cylinder, sat pill on top of mud with a syringe. Left for 3 hours for pill to set. Placed 1.87 field mud on top of pill. | A small interphase on both sides of pill. Difficult to see the pill due to black mud and black pill. |
| Test 2 | Top: 2.08 sg mud<br>Mud Pill - 15/15<br>Bottom: 1.87 sg mud | Placed 1.87 sg mud in measuring cylinder, sat pill on top of mud with a syringe. Left for 2 hours for pill to set. Placed 2.08 sg field mud on top of pill. | After 2 hours set time, the more dense mud went straight to the bottom. |
| Test 3 | Top: 2.08 sg CsF, 10 g/L polymers<br>Mud Pill - 15/15<br>Bottom: 1.87 sg CsF, 10 g/L polymers | Placed 1.87 sg CsF in measuring cylinder, sat pill on top of mud with a syringe. Left for 2 hours for pill to set. Placed 2.08 sg CsF on top of pill. | CsF too viscous with 10 g/L polymers |
| Test 4 | Top: 2.08 sg CsF, 5 g/L polymers<br>Mud Pill - 15/15<br>Bottom: 1.87 sg CsF, 5 g/L polymers | Pill placed in 1.87 sg CsF with a syringe. 2.08 sg CsF placed on top of pill | CsF too viscous with 5 g/L polymers |
| Test 5 | Top: 2.08 sg CsF, 2 g/L polymers<br>Mud Pill - 15/15<br>Bottom: 1.87 sg CsF, 2 g/L polymers | Pill placed in 1.87 sg CsF with a syringe. Left for 3 hours before displacing 2.08 sg CsF on top of pill | OK with 2 g/L polymers |
| Test 6 | Top: 2.08 sg CsF<br>Mud Pill - 15/15<br>Bottom: 1.87 sg CsF, 2 g/L polymers | Let pill set in 1.87 sg CsF. Displaced 2.08 sg pure brine on top. | It seemed like the brine dissolved/diluted the pill. |
| 1.87 sg CsFormate pill - Measuring Cylinder - 30 degrees Inclination | | | |
| Test 7 | Top: 2.08 sg CsF, 2 g/L polymers<br>CsF Pill - 15/15<br>Bottom: 1.87 sg CsF, 2 g/L polymers | Placed CsF pill in 1.87 sg CsF. Left for 3 hour to set. Displaced 1.87 sg on top with 2.08 sg CsF. | Interphase on both sides of pill. Pill too viscous, problems getting "tools" through. |
| Test 8 | Top: 2.08 sg CsF, 2 g/L polymers<br>Mud Pill - 12/12<br>Bottom: 1.87 sg CsF, 2 g/L polymers | Placed CsF pill in 1.87 sg CsF. Left for 3 hour to set. Displaced 1.87 sg on top with 2.08 sg CsF. | Interphase on both sides of pill. Pill too viscous, problems getting "tools" through. |
| Test 9 | Top: 2.08 sg CsF, 2 g/L polymers<br>Mud Pill - 10/10<br>Bottom: 1.87 sg CsF, 2 g/L polymers | Placed CsF pill in 1.87 sg CsF. Left for 3 hour to set. Displaced 1.87 sg on top with 2.08 sg CsF. | Looked OK, no problems getting "logging tools" though. Pill kept the 2.08 CsF on top. |

Example 2b

Separation Ability at 40° C. and at 30 Degrees Inclination

A 2 meter long pipe having an ID of 5 cm and a Manometer at the bottom was used to run the same test on a larger scale. The pipe was filled with a 1.87 sg CsF (added 2 kg/m$^3$ polymers), then a 10/10 pill was pumped and placed in the CsF bring. The pipe was left at a 30 degree angle at 40° C. overnight. The 1.87 sg brine on top was displaced with a 2.08 sg CsF bring (added 2 kg/m$^3$ polymers). After the displacement,

TABLE 3

| | Measured Pressure | |
|---|---|---|
| When | Equation<br>1.87 sg CsF + pill +<br>($\rho + g + h$) = pressure | Actual Measurement |
| Prior to Displacement | 1.87 sg CsF + pill +<br>(1.87 sg CsF × 0.0981 × 0.44) | 203 mbar |
| After Displacement | 1.87 sg CsF + pill +<br>(2.08 sg CsF × 0.0981 × 0.44) | 211 mbar |
| Measurement Difference | | 8 mbar |
| Control | (2.08 − 1.87) × 0.0981 × 0.44 | 9 mbar |

Example 4

Full Scale Test

A test wellbore was displaced to contain a Cs/K Formate fluid having a density of 1.895 sg at 50° C. The fluid was circulated until an even density was measured, and a downole gauge sensor was run on wireline prior to spotting the pill. A volume of 7.9 m$^3$ at a density of 1.976 sg at 50° C. was prepared using 5.5 m$^3$ CsF brine at 2.127 sg, 0.8 m$^3$ freshwater, 0.8 m$^3$ EMI-771, and 75 kg DUOTEC™ NS.

The placement of the pill involved a pump and pull operation, pumping at a rate of 200 Lpm the first third of the volume at 680 meters measured depth (mMD) before starting to pull while pumping the remaining volume to end up at 530 mMD as the final volume is pumped. The pipe was rotated at 30 rpm to ensure even distribution of the pill in the annulus.

A volume of 4 m$^3$ 2.075 sg high viscosity brine was mixed with 10 kg/m$^3$ DUOTEC™ NS and also pumping according to the pump and pull operation. The rheology of the fluid was recorded to be 150-120-101-71-30-29cP (at 600-300-200-100-6-3 rpm). The rheology was determined using a Fann 35 Viscometer.

The pipe was pulled to 526 m to avoid washing out at the top of the viscosified pill while placing the high viscosity brine. The pipe was then pulled to the top of the 2.075 sg brine before displacing the remaining annulus to the same density brine viscosified with 4.5 kg/m3 DUOTEC™ NS. Returns of heavy brine were received on surface at expected pump strokes indicating that the pill successfully isolated the lighter fluid below. The pressure monitored by the gauge on the bottom of the well was 297.2 bars after the displacement, which corresponded with the wire line logs. The calculated pressure with corrected densities was 300.1 bars which indicates that the well was not fully topped up after pulling out the string.

The following day, a first wire line log was run, followed by a second log six days later. The weight of the logging tool was reduced from 170 to 110 kg at 30 m RKB. This was probably due to fragments of the pill that was flushed away as the 2.075 sg fluid was displaced into the hole. A noticeable increased weight on the wireline was experienced at 679 mMD as the tool passed through the pill. The surge and swab effects can be seen on the overview graph shown in FIG. 1. As shown in FIG. 1, the second logging run showed identical pressures to the previous logging run.

The pill was displaced out of the well three weeks later. The first step in the pill displacement was running into the hole to a depth of 530 m and rotating at 30 rpm for 5 minutes to break the gels before pumping. The pumps were started slowly to monitor the required pressure to break the gels. No pressure increase was observed. The maximum downhole pressure recorded while pumping was 310 bar, with an SPP of 37 bar while pumping 946 Lpm. The maximum pressure while tripping in through the high-vis pill was 307 bar at a tripping speed of 130 sec/std. The maximum pressure increase while tripping in through the pill to 680 m was 4 bars at the same tripping speed.

The pill was returned across shakers to try to screen out as much cross linked polymers as possible. The flow rate was increased to 2000 Lpm but reduced to 1000 Lpm to enable screening out as much polymer as possible on the shakers. There was no visible increase in viscosity as the pill was returned to surface. The rheology of the fluid was: 55-35-27-19-6-5cP (at 600-300-200-100-6-3 rpm). This indicates that most of the xanthan gum polymers were effectively cross linked and screened out rather than contributing to increased viscosity of the brine. Thus, it was concluded that the pill could be incorporated into the 1.892 sg mud without further treatment. Some interference of the interface between the pill and the high viscosity 2.075 sg brine was reported.

A new pill was set from 690 m to 540 m using the same procedure as the first pill. However, the second pill was mixed up using a different procedure to ensure better mixing of the viscous EMI-771. In the second pill, 5 kg/m$^3$ DUOTEC™ NS was added before EMI-771 was added, and the final 5 kg/m$^3$ DUOTEC™ NS was added after the addition of EMI-771. The viscosity was lower than the first pill: 127-105-92-71-27-23 (at 600-300-200-100-6-3 rpm). The pill was continually circulated to avoid excessive cross linking.

The 3 m$^3$ high viscosity 2.075 sg mud was displaced at a pump rate of 200 Lpm. The high viscosity brine was pumped after pulling up from 530 to 452 mMD before commencing to displace in a 2.075 sg fluid at a rate of 500 Lpm. After pulling out of the hole, the well was filled up using the kill line.

A "Surge and Swab Tool" available from Seadrill was used to expose the well to surge pressures as those expected when running a completion screen hanger assembly through a casing. The tool was run into the hole to 480 m and circulated the 2.075 sg fluid. The SPPs were 4.2 bar at 300 Lpm; 8.1 bar at 600 Lpm, and 14 bar at 880 Lpm. The recorded down hole pressures varied from 4 to 6 bars. The tool was then run into the hole to 590 m and circulated the 2.075 sg fluid. The SPPs were 5.2 bar at 300 Lpm and 6.8 bar at 600 Lpm. The recorded down hole pressures varied from 4 to 7 bars. The tool was then run into the hole to 740 m and circulated the 1.89 sg fluid. The SPPs were 5.0 bar at 300 Lpm and 5.9 bar at 600 Lpm. The recorded down hole pressures varied from 4 to 5 bars. The pressure increase while running through the pill was 4 to 6 bars. The crosslinked pill was displaced out of the hole with a variable pump rate to avoid shaker overflow and as allow as much of the polymers to be screened out as possible.

Advantageously, embodiments of the present disclosure provide for at least one of the following. A polymer pill of the present disclosure may have sufficient integrity to isolate two fluids in a wellbore from each other while also balancing the reservoir pressure. A pill having sufficient integrity may allow for the pill to remain intact during logging and completion operations. Further, the pill may allow for the operator to perform such operations without changing the total fluid volume, thus reducing logistic challenges and costs. The pill may also provide stability in the hole with no or little tendency of sag over a length of time of at least two weeks. Further, pressure increases due to a heavier fluid may be fully transmitted through the pill to the bottom hole.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A pill for wellbore operations, comprising:
   a base fluid; and
   at least two polymers that interact to form a gelatinous structure characterized as isolating and controllably transmitting hydrostatic pressure between a first wellbore fluid above the pill in a wellbore and a second wellbore fluid below the pill in the wellbore, wherein a first of the at least two polymers comprises an anionic polysaccharide.

2. The pill of claim 1, wherein the base fluid comprises an aqueous fluid selected from at least one of fresh water, sea water, a brine containing organic or inorganic dissolved salts, a liquid containing water-miscible organic compounds, and combinations thereof.

3. The pill of claim 2, wherein the brine comprises a halide or carboxylate salt of at least one of cesium, potassium, calcium, zinc, and sodium.

4. The pill of claim 1, wherein the base fluid comprises an oleaginous fluid selected from diesel oil, mineral oil, synthetic oil, esters, ethers, acetals, dialkylcarbonates, olefins, and combinations thereof.

5. The pill of claim 1, wherein a first of the at least two polymers comprises xanthan gum.

6. The pill of claim 1, wherein a second of the at least two polymers comprises at least one polyetheramine and salts thereof.

7. The pill of claim 1, wherein the pill is further characterized as maintaining integrity following mechanical interruption.

8. The pill of claim 1, wherein the pill is solids free.

9. The pill of claim 1, wherein the pill is elastomeric.

10. The method of claim 1, wherein the base fluid has a density substantially identical to the first wellbore fluid.

11. The method of claim 10, wherein the pill comprises:
a base fluid; and
at least two polymers that interact to form the gelatinous structure.

12. The method claim 10, wherein the pill comprises:
a brine comprising a halide or carboxylate salt of at least one of cesium, potassium, calcium, zinc, and sodium;
a xanthan gum or derivatives thereof; and
a polyetheramine or salts thereof.

13. The pill of claim 1, wherein the at least two polymers interact by crosslinking or ionic interaction.

14. A pill for wellbore operations, comprising:
a base fluid; and
at least two polymers that interact to form a gelatinous structure isolating and transmitting hydrostatic pressure between two fluids within a wellbore, wherein a first of the at least two polymers comprises an anionic polysaccharide.

15. The pill of claim 14, wherein the at least two polymers interact by crosslinking or ionic interaction.

16. The pill of claim 14, wherein a first of the at least two polymers comprises xanthan gum.

17. The pill of claim 14, wherein a second of the at least two polymers comprises at least one polyetheramine and salts thereof.

18. The pill of claim 14, wherein the pill is characterized as maintaining integrity following mechanical interruption.

19. The pill of claim 14, wherein the pill is solids free.

20. The pill of claim 14, wherein the at least two polymers have distinct chemical structures.

21. The pill of claim 14, wherein the pill is disposed in a wellbore, wherein a first wellbore fluid is in a lower region of the wellbore than the pill and a second wellbore fluid is an upper region of the wellbore than the pill, and wherein the first wellbore fluid has a density substantially identical to the base fluid, and the second wellbore fluid has a density greater than the first fluid.

* * * * *